(No Model.)
J. A. BROWN.
SURVEYOR'S TRANSIT.
No. 460,909. Patented Oct. 6, 1891.
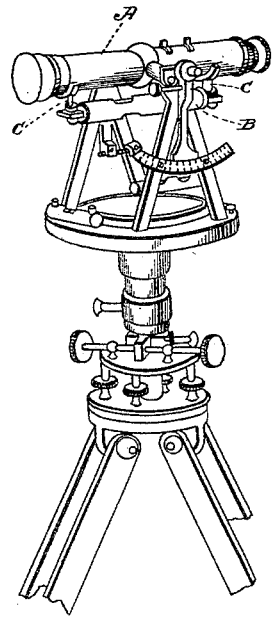
Fig. 1.
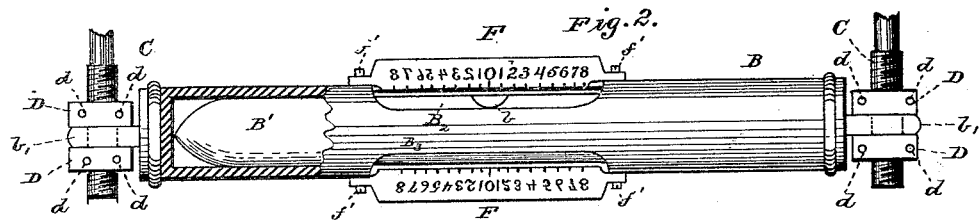
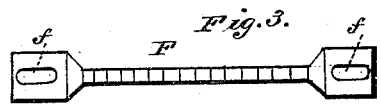
Witnesses
M. B. Harris
J. C. Wilson
Inventor
James A. Brown
by
Whitman + Wilkinson
Attorneys

UNITED STATES PATENT OFFICE.

JAMES A. BROWN, OF WILMINGTON, OHIO.

SURVEYOR'S TRANSIT.

SPECIFICATION forming part of Letters Patent No. 460,909, dated October 6, 1891.

Application filed April 11, 1891. Serial No. 388,450. (No model.)

*To all whom it may concern:*

Be it known that I, JAMES A. BROWN, a citizen of the United States, residing at Wilmington, in the county of Clinton and State of Ohio, have invented certain new and useful Improvements in Level-Tubes for Surveying-Instruments; and I do hereby declare the following to be a full, clear, and exact description of the invention, such as will enable others skilled in the art to which it appertains to make and use the same.

My invention relates to theodolites, transits, levels, and other similar instruments used in surveying; and it consists of a certain simplified construction for leveling the same, which will be hereinafter described and claimed.

Reference is had to the accompanying drawings, wherein the same parts are indicated by the same letters.

Figure 1 represents a perspective view of a surveyor's theodolite fitted with my improved level-tube. Fig. 2 represents a profile view of my improved level-tube partly in section. Fig. 3 represents a plan view of one form of level-scale.

A represents the telescope of the theodolite or transit mounted as usual.

B represents a long level tube, preferably of brass, secured to the said telescope A and parallel to the line of sight. In the interior of B, I have a long glass bubble-tube B', secured in the usual way. At the top and bottom of long brass tube B, I have two central slots to show the bubble $b$, and over each of these slots I have a graduated scale F to indicate when the bubble $b$ is in a central position. The brass tube B has flat arms $b'$, which slip over the screws C rigidly attached to the telescope of the theodolite. The said arms $b'$ are held between nuts D, which are adjusted with capstan-bars fitting in the holes $d$. The function of the double slot in the tube B is to provide a means for leveling the instrument when the barrel is revolved vertically through one hundred and eighty degrees, thus providing against the necessity for using two level-tubes, one above and one below the barrel of the instrument, or of unclamping the plates. This is specially desirable when leveling work is being done.

Owing to inequalities in the wyes or in the glass tube, scale, or other parts of the instrument, the central position of the bubble when the instrument is level and the bubble tube under it, as shown in the drawings, is not necessarily in the same vertical line with the central position of the bubble when the instrument is level and the bubble-tube over it. In other words, the two scales F must each be independently adjusted for each instrument. This would first be done at the instrument, makers, as follows: Fasten the glass bubble-tube firmly in the long brass tube and rigidly fix a scale over the upper slot. Attach the long tube to the telescope and in the ordinary way make it parallel to the line of collimation. The bubble now being in the center of the scale, carefully observe the height on a leveling-rod. Turn the telescope vertically through one hundred and eighty degrees and the upper parts of the instrument one-half way around. The bubble is now in the opposite slot. Clamp the axis of the telescope and bring the horizontal cross-line to the observed height, carefully mark the position of the bubble, and place over it a scale, whose zero-line stands over its central point. This scale may be rigid or movable longitudinally, as shown in Fig. 3, where F represents the scale, and $f$ slots for longitudinal adjustment.

The adjustment: Carefully level the plates, bring the bubble to the center of one of the scales, and observe the height on a leveling-rod, turn the telescope vertically through one hundred and eighty degrees and the upper parts of the instrument one-half way around, bring the bubble to the center of this opposite scale, and again observe the height on the rod. If the two heights are the same the long tube is in adjustment. If not the same turn the horizontal cross-line on a point midway between the two observed heights, clamp the telescope in this position, and by means of the capstan-nuts bring the bubble to the center of the scale, which completes the adjustment.

I am aware that two tubes have been employed to do the work of the one invented by me; but I claim that the use of a single tube with slots on either side for the bubble not only simplifies the construction and diminishes the cost of the instrument, but it also renders it more readily adjustable, more compact, and generally more convenient.

Having thus described my invention, what I claim, and desire to secure by Letters Patent of the United States, is—

1. In an instrument for surveying, the combination, with a telescope, of a level-tube secured thereto parallel to the line of sight, said level-tube having upper and lower slots with a scale on each slot for the bubble, substantially as described.

2. In an instrument for surveying, the combination, with a telescope, of a level-tube connected to the said telescope by screws rigidly attached to the telescope, said tube having arms held between nuts moving on the said screws and having upper and lower slots for the bubble with adjustable scales fitted to each slot, substantially as described.

3. In a theodolite, the combination, with the telescope A, having screws C rigidly secured thereto, of the tube B, inclosing a glass bubble-tube B', said tube B having opposite apertures $B^2$ and $B^3$ for the bubble and arms $b'$ and $b'$, slipping over the screws C, scales F, having elongated apertures $f$ for the screws $f'$, secured over said apertures, and nuts D, holding said arms $b'$, substantially as described.

In testimony whereof I affix my signature in presence of two witnesses.

JAMES A. BROWN.

Witnesses:
MARY B. GLASS,
EGBERT B. HOWLAND.